United States Patent
Martino-Gonzalez et al.

(10) Patent No.: US 11,131,243 B2
(45) Date of Patent: Sep. 28, 2021

(54) AUXETIC BI-STABLE STRUCTURE

(71) Applicant: Airbus Operations S.L., Getafe (ES)

(72) Inventors: Esteban Martino-Gonzalez, Getafe (ES); Iker Velez De Mendizabal Alonso, Getafe (ES); Vasilis Votsios, Getafe (ES); Guillermo Nicolas Gutierrez, Getafe (ES); Diego Sanchez Franco, Getafe (ES); David Matesanz Hidalgo, Getafe (ES); Jose Angel Hernanz-Manrique, Getafe (ES)

(73) Assignee: AIRBUS OPERATIONS S.L., Getafe (ES)

( * ) Notice: Subject to any disclaimer, the term of this patent is extended or adjusted under 35 U.S.C. 154(b) by 251 days.

(21) Appl. No.: 16/281,799

(22) Filed: Feb. 21, 2019

(65) Prior Publication Data

US 2019/0264610 A1 Aug. 29, 2019

(30) Foreign Application Priority Data

Feb. 27, 2018 (EP) .................................... 18382119

(51) Int. Cl.
| | |
|---|---|
| *F02C 7/042* | (2006.01) |
| *B64D 41/00* | (2006.01) |
| *B64D 13/00* | (2006.01) |
| *B64C 1/14* | (2006.01) |
| *B64D 33/02* | (2006.01) |
| *B64C 1/00* | (2006.01) |

(52) U.S. Cl.
CPC ............ *F02C 7/042* (2013.01); *B64C 1/1446* (2013.01); *B64D 13/00* (2013.01); *B64D 33/02* (2013.01); *B64D 41/00* (2013.01); *B64C 2001/009* (2013.01); *B64D 2033/0213* (2013.01); *B64D 2241/00* (2013.01)

(58) Field of Classification Search
CPC ......... F02C 7/042; B64C 1/14; B64C 1/1446; B64C 2001/009; B64D 13/00; B64D 33/02; B64D 41/00; B64D 2033/0213; B64D 2241/00; F16K 11/022
See application file for complete search history.

(56) References Cited

U.S. PATENT DOCUMENTS

| | | | |
|---|---|---|---|
| 9,538,798 B2* | 1/2017 | Toronjo | A43B 23/028 |
| 2006/0129227 A1* | 6/2006 | Hengelmolen | A61F 2/915 |
| | | | 623/1.16 |
| 2006/0163431 A1 | 7/2006 | Dittrich | |
| 2014/0311580 A1* | 10/2014 | Howarth | F02C 7/057 |
| | | | 137/12 |
| 2016/0177567 A1 | 6/2016 | Gandhi | |

FOREIGN PATENT DOCUMENTS

| | | |
|---|---|---|
| CN | 102518517 A | 6/2012 |
| CN | 102768377 A | 11/2012 |
| GB | 2496167 A | 5/2013 |

OTHER PUBLICATIONS

European Search Report; priority document.

* cited by examiner

*Primary Examiner* — Steven M Sutherland
(74) *Attorney, Agent, or Firm* — Greer, Burns & Crain, Ltd.

(57) ABSTRACT

An auxetic bi-stable structure that comprises an auxetic curved shell movable between a first and a second stable position, and a rigid element. At least part of the surface of the auxetic curved shell is joined to the rigid element such that the curved shell is movable with respect to the rigid element between the first and second stable positions.

14 Claims, 15 Drawing Sheets

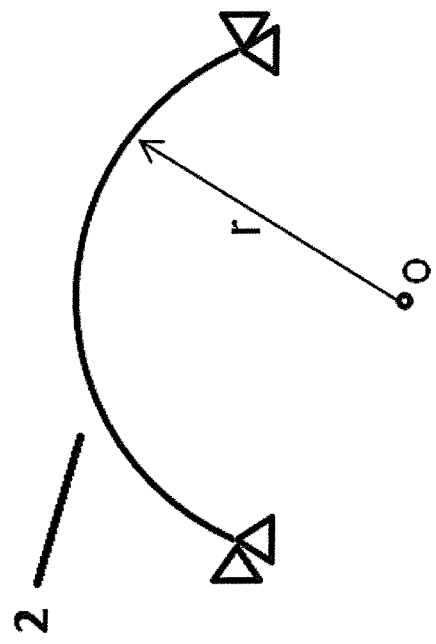
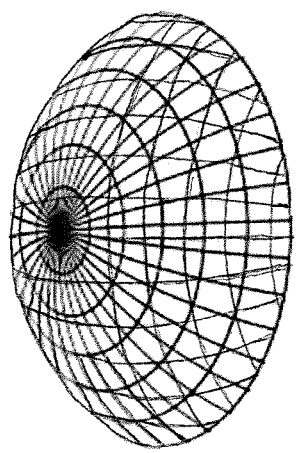
FIG. 2
Prior Art

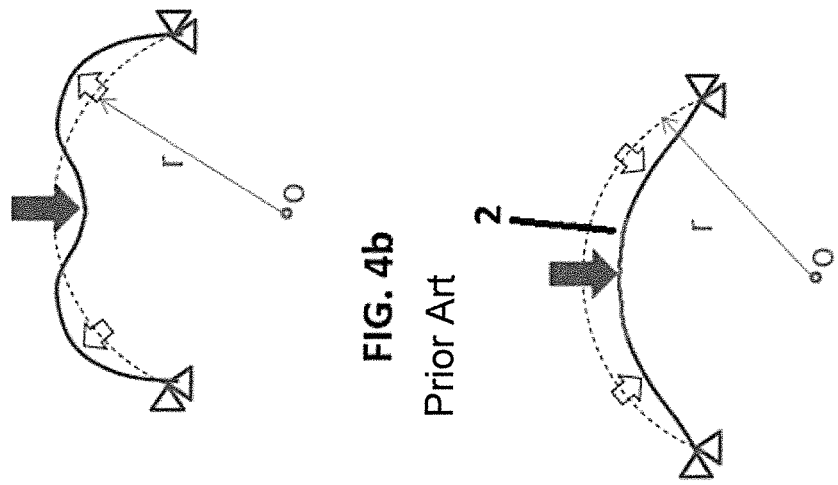
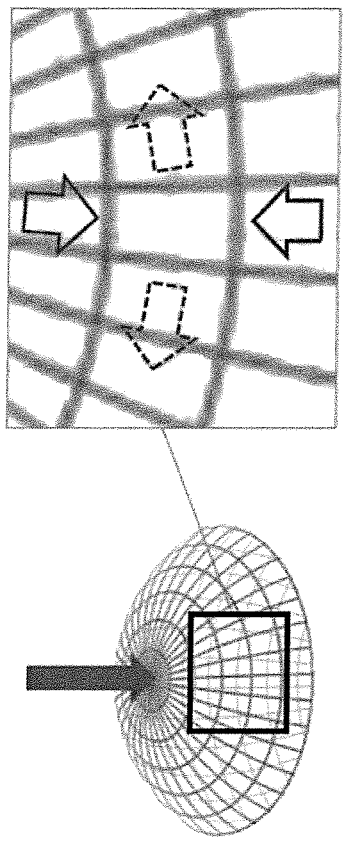
FIG. 4a
Prior Art
FIG. 4b
Prior Art
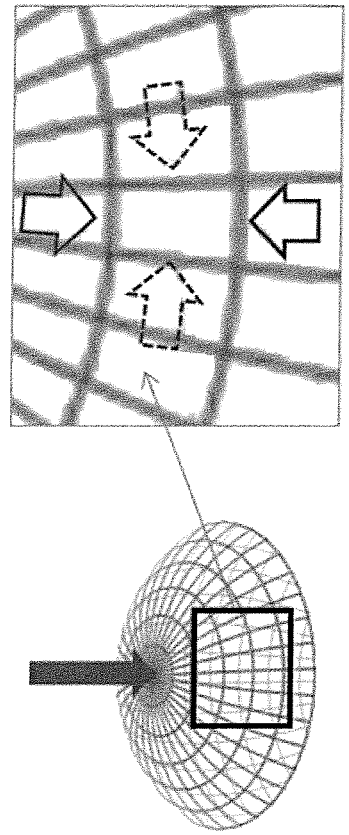
FIG. 5a
Prior Art
FIG. 5b
Prior Art

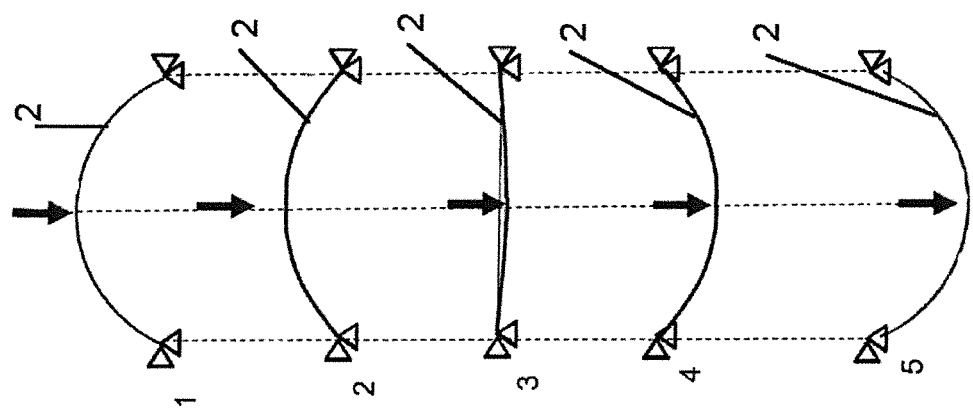
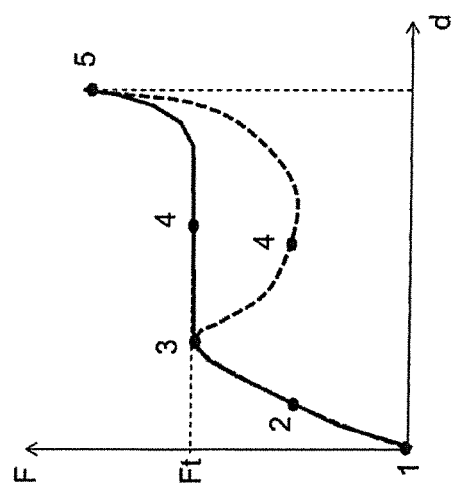
FIG. 6a
Prior Art
FIG. 6b
Prior Art

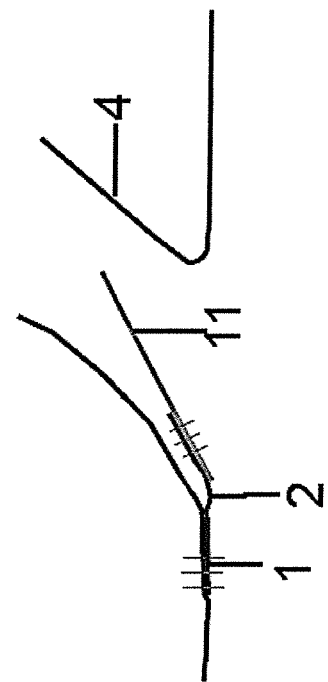
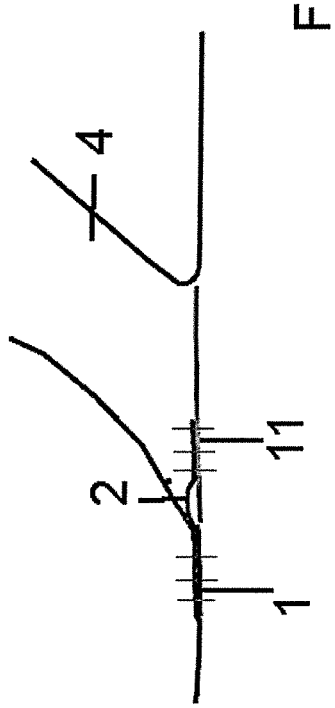
FIG. 14

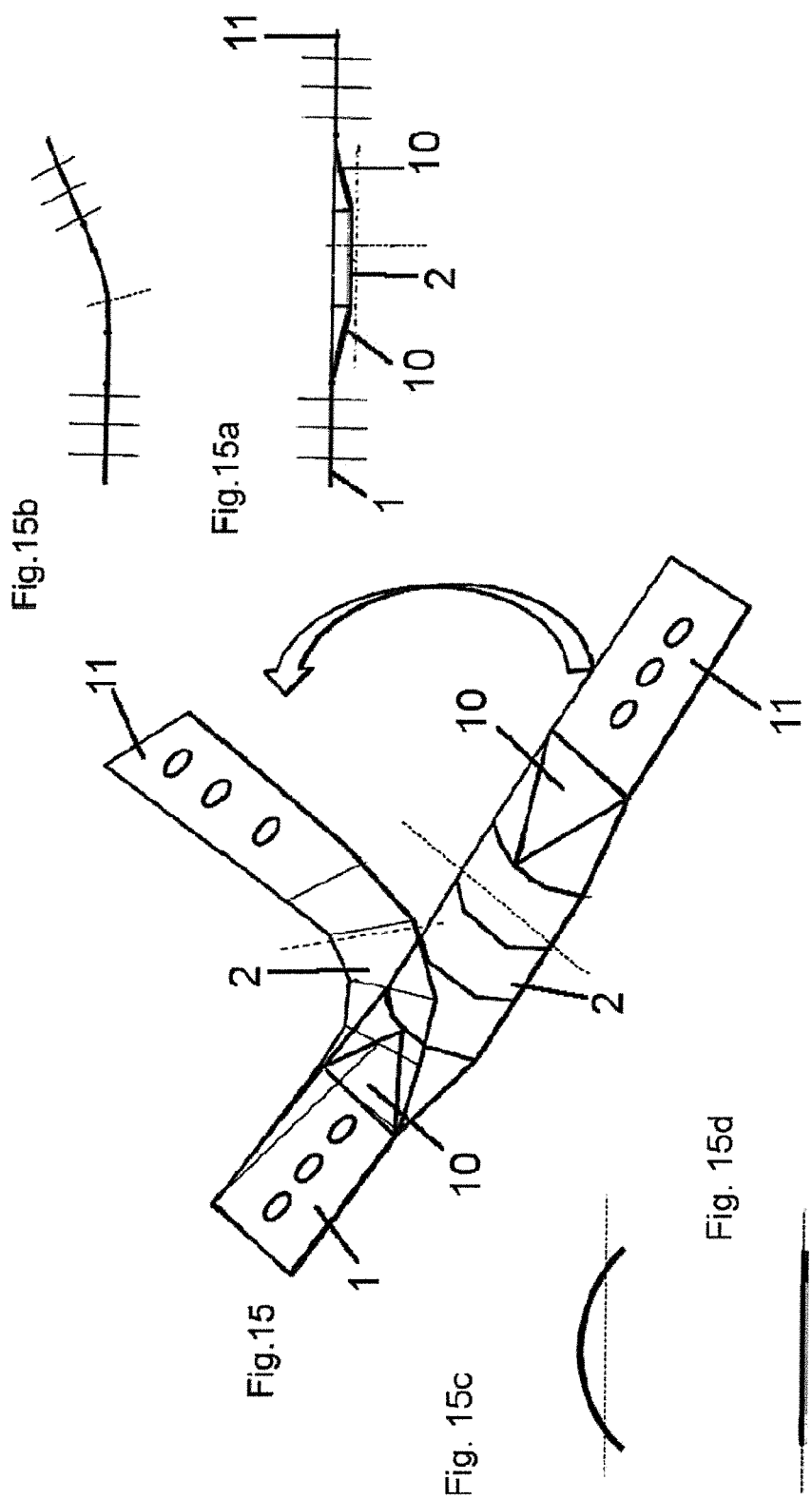

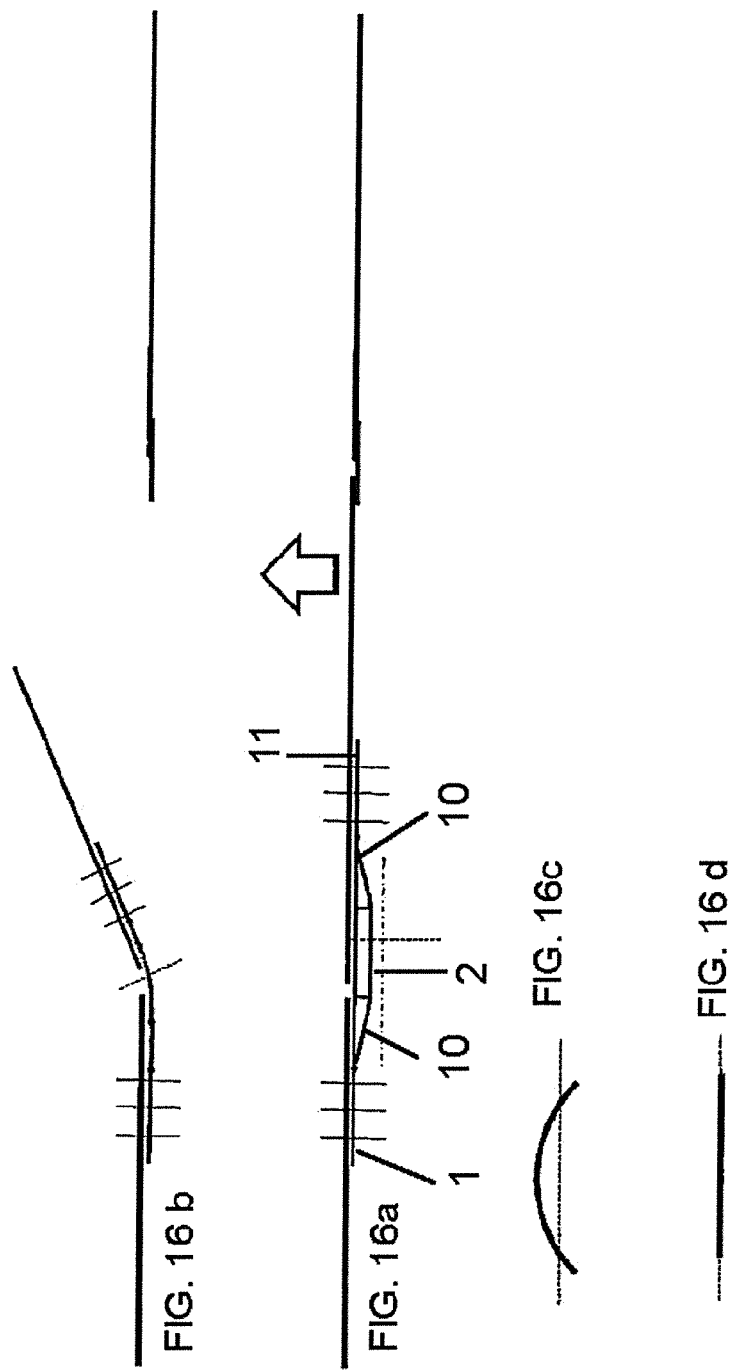

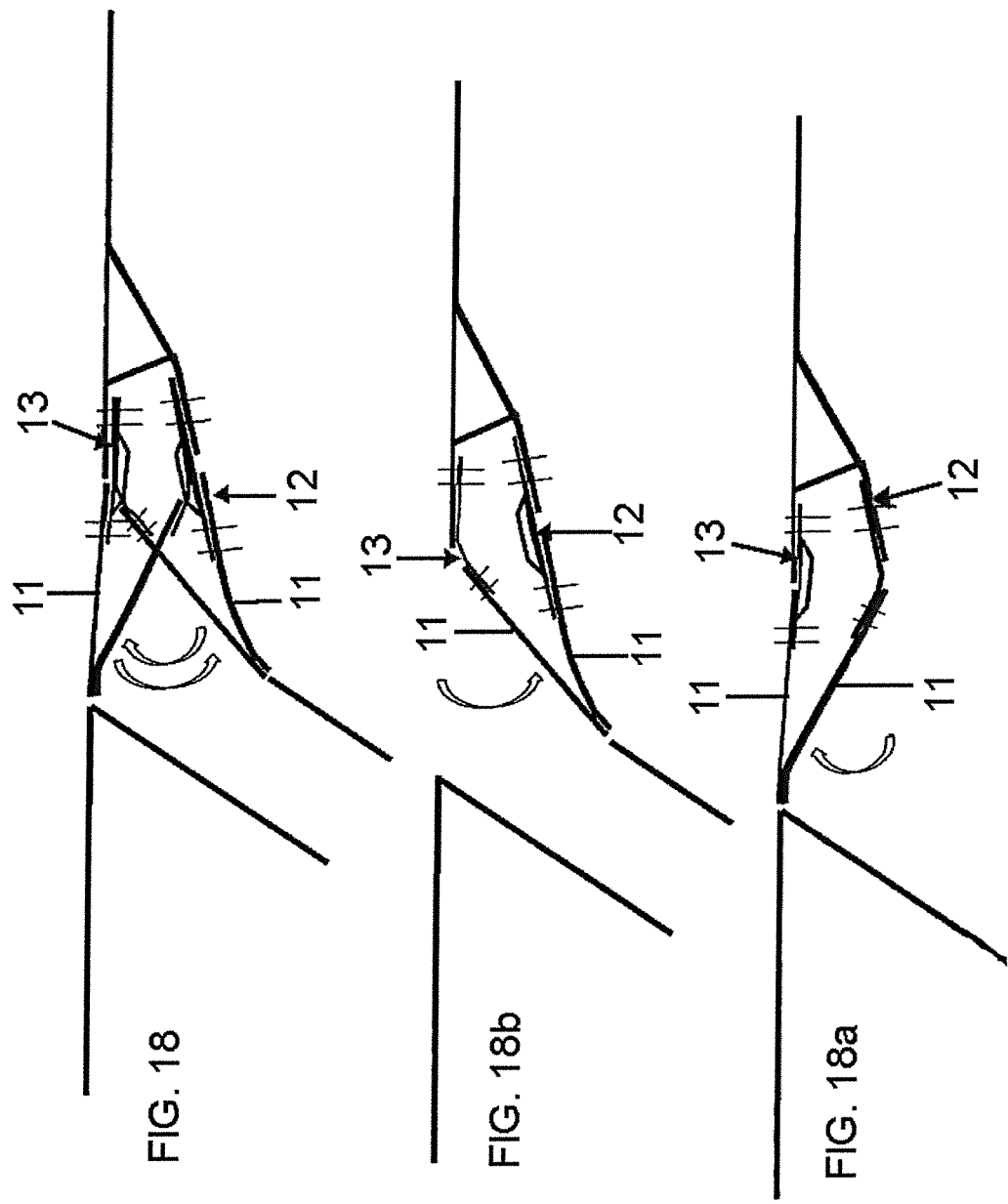

AUXETIC BI-STABLE STRUCTURE

CROSS-REFERENCES TO RELATED APPLICATIONS

This application claims the benefit of the European patent application No. 18382119.8 filed on Feb. 27, 2018, the entire disclosures of which are incorporated herein by way of reference.

FIELD OF THE INVENTION

The invention relates to auxetic structures, in particular, to auxetic curved shells and applications thereof.

BACKGROUND OF THE INVENTION

Conventional materials found in nature have a positive Poisson ratio, they get thinner when stretched and widened when compressed, following the Poisson ratio equation:

$$v_{yx} = -\frac{\text{transverse strain}}{\text{axial strain}} = -\frac{\varepsilon_x}{\varepsilon_y}$$

Accordingly, Poisson's ratio is defined as the negative of the transverse strain divided by the longitudinal strain.

There are materials or structure geometries configurations that exhibit opposite behavior, that are called auxetic, having a negative Poisson ratio and when stretched, they become wider on the transversal directions to the applied force, and thinner when compressed. Therefore, applying a unidirectional tensile force to auxetic material results in an increase in size in the transverse dimension and applying unidirectional compression force results in a decrease in size in the transverse dimension.

There are known two dimensional auxetic structures having a cell arrangement comprising a plurality of adjoining cells being shaped as inverted hexagons that present an auxetic behavior in the two in-plane directions of the cell's geometry. This structure is called a re-entrant hexagonal configuration. Deformation of such configuration under traction can be observed on FIG. 1 for both conventional and re-entrant hexagonal configurations.

When the structure is a shell, or what may be the same, a dome-shaped layer or a curved layer, that is characterized in that its thickness is very small compared with other two dimensions, the deformation behavior is driven in part by the Young modulus but also by the Poisson ratio as shown on the following formulas that represents an approximate relation between stresses and strains for reduced curvature shell with isotropic linear elastic material. For other, non-isotropic materials and with higher curvature shells the formulas are more complex but Poisson ratio is also a fundamental driver.

$$\begin{bmatrix} \sigma_x \\ \sigma_y \\ \tau_{xy} \end{bmatrix} = \frac{E}{1-v^2} \begin{bmatrix} 1 & v & 0 \\ v & 1 & 0 \\ 0 & 0 & (1-v)/2 \end{bmatrix} \begin{bmatrix} \varepsilon_x \\ \varepsilon_y \\ \gamma_{xy} \end{bmatrix}$$

When the structure is a curved shell or dome that is exposed to loads producing compression on its walls, the influence of the Young modulus and Poisson ratio on the deformation is even higher as they drive both the stable strength deformation and also the buckling or unstable behavior.

By considering an auxetic material with negative Poisson ratio instead of a conventional material, it is possible to control de deformation behavior of curved shells or domes which can produce significant advantages.

SUMMARY OF THE INVENTION

The invention comprises combining a shell of auxetic material with a rigid element, particularly a spherical, elliptical, cylindrical, conical, toroidal or other curved sector geometry, so that the shell works like a concave shape or dome.

Contrary to the curved shells of conventional material, when punctual forces or pressure are applied to proposed structure formed by auxetic materials and produces compression on its walls, the curved shell is able to deform on a more controlled manner, so that it can change its entire shape or a portion of it from a concave to a convex geometry.

FIG. 2 shows a spherical sector that is a curved shell with constant radius of curvature over its entire surface. This geometry with simple supports on the edges, is used to simplify the explanation. As shown in FIGS. 33a and 3b, when normal pressure or punctual normal loads are applied towards its center of curvature, compression appears on the hemispherical direction. With a conventional material, this shell structure tends to expand on the meridian direction under this loading, as shown in FIG. 4a, due to their positive Poisson ratio. This meridian expansion shown in the section cut of FIG. 4b has a stiffening effect on the shell, avoiding its deformation towards the center of curvature. It also produces compression stress on the meridian direction because this expansion is constrained by the different expansion of the adjacent meridians due to the curvature. This compression is added to the hemispherical compression, resulting in a bi-compression state that favors the buckling of the shell and, as a consequence, the sudden non-controlled shape change and deformation that is not desirable.

As shown in FIG. 5a, on an auxetic material this curved shell is able to shrink in the meridian direction, when a compression on the hemispherical direction is applied, due to the negative Poisson ratio. This meridian expansion shown on the section cut of FIG. 5b allows that stiffening and bi-compression effects are less pronounced or removed, allowing deformation to be smoother and to be better controlled.

This behavior allows the easing of the transition between concave to convex geometry without forcing the strength or plasticization limit of the material so that deformation can be fully reversible and the resistance against this transformation can be controlled and reduced. In order to return to initial position, a similar force or pressure level needs to be applied in the opposite direction so that the entire or local portion deformed shape changes again to its initial position, from a convex back to a concave geometry.

The resulting force evolution versus displacement is represented in FIG. 6a in which different loading points 1 to 5 are represented and in FIG. 6b in which a sequence of structure positions is represented for the same loading points 1 to 5. It can be seen that the transition between concave and convex shape produces significant deformation. It is also observed that there is a significant amount of area allocated below the force-displacement curve. In particular, it appears a plateau that represents a "cero" stiffness increase (continuous line), or with significant reduced positive stiffness slope (not represented), compared to initial loading phase (points 1 to 3) or even an inflexion point followed by negative stiffener (dotted line) of the structure, in all three cases, leading to large deformation. This area represents the energy absorbed by the deformation which is much higher than for the case of curved shells with conventional non auxetic materials that tent to produce higher stiffeners with reduced deformation, followed by a sudden buckling unstable behavior that is difficult to control. As a result, proposed structure is able to absorb higher energies when deforming, and in a more progressive and controlled manner.

This plateau or pick force also represents the threshold of the applied force (Ft) necessary to make the structure change to large deformation state. This plateau of "cero" stiffness increase or even negative stiffness behavior, represent a so called bi-state structure that required such threshold force (Ft) to transform from concave to convex geometry, producing only large deformation when reaching required level of loads. Equivalent level of opposite force threshold is necessary to transform back from convex to initial concave shape, obtaining clearly two positions of the structure when the threshold loads are reached. This behavior is very interesting for passive mechanical actuations that change position only when controlled threshold loads conditions are reached.

This behavior is also very interesting as it generates a hysteresis mechanism able to absorb significant amount of energy on repeated cyclic effort requirements, as it is the case on vibration application.

Equivalent behavior is also observed in other curved shell structures with elliptical, cylindrical, conical, toroidal or other curved sector geometry or even on shells formed by planar sub-elements covering a curved sector, so that the presented invention is also applicable to those other curved shells structures for which some 3d geometry and sections of revolution are represented in FIG. 7.

This invention is also applicable to concave portions of shell structures covering a generic surface as represented in FIG. 8.

By changing the geometrical parameters of the curved shell sector as the curvature, thickness, the auxetic material, pattern, the section of each segment and associated angles, it is possible to tune the force and deformation and ranges that will best adapt to the specific required application.

It is a first object of the invention an auxetic bi-stable structure, comprising:
- an auxetic curved shell movable between a first and a second stable position, and
- a rigid element wherein at least part of the surface the auxetic curved shell is joined to the rigid element such that the curved shell is movable with respect to said rigid element between said first and second stable positions.

The auxetic curved shell can be constructed by different wireframe patterns or even by a continuous material. In the case of wireframe auxetic patterns summited to pressure, additional layer of flexible material is required in order to contain the direct pressure load.

Additionally, the auxetic curved shell may comprise a structure having a plurality of interconnected auxetic cells with an auxetic behavior in the surface direction of the shell or it can be an auxetic material.

BRIEF DESCRIPTION OF THE DRAWINGS

To complete the description and in order to provide for a better understanding of the invention, a set of drawings is provided. The drawings form an integral part of the description and illustrate preferred embodiments of the invention. The drawings comprise the following figures.

FIG. 2 shows a schematic representation of the behavior of a non-deformed shell.

FIGS. 4a and 4b show the deformation of a spherical sector shell of non-auxetic material. FIG. 4a shows the expansion on meridional direction and FIG. 4b the deformation on a section cut.

FIGS. 5a and 5b show the deformation of a spherical shell sector of auxetic material. FIG. 5a shows the contraction on meridional direction and FIG. 5b the deformation on a section cut.

FIG. 6a shows the force evolution versus displacement in an auxetic shell configuration with the different load evolution points and FIG. 6b shows the deformation of a spherical shell sector of auxetic material for each one of these points.

FIG. 14 show a schematic representation of a sixth embodiment of the invention located in the aperture of a duct.

FIGS. 15, 15a, 15b, 15c and 15d show a schematic representation of a seventh embodiment of the invention.

FIGS. 16a-16d show the application of the embodiment of FIG. 15 as a bi-state hinge into an access hole of for instance a locking door.

FIGS. 18, 18a and 18b show a schematic the application of the embodiment of FIG. 15 as a bi-state hinge located into the aperture of a duct.

DETAILED DESCRIPTION OF THE PREFERRED EMBODIMENTS

FIGS. 9 to 18b disclose several embodiments, most of them implemented in a passive bi-state aerodynamic auxiliary power unit (APU) intake, cabin air system intake, auxiliary ventilation intake or other system intake, that could be placed on the nacelle, fuselage, belly fairing, tails surfaces, or other surface of an aircraft.

Particularly, the auxetic curved shell (2) and the rigid element (1) could be joined such that the movement of the part of the surface of the auxetic curved shell (2) joined to the rigid element (1) is restricted in one direction in a Cartesian coordinate system. In another alternative, the auxetic curved shell (2) and the rigid element (1) are joined such that the movement of the part of the surface of the auxetic curved shell (2) joined to the rigid element (1) is restricted in two directions in a Cartesian coordinate system or even restricted in two directions and in a momentum perpendicular to said two directions in a Cartesian coordinate system.

Figure 1:
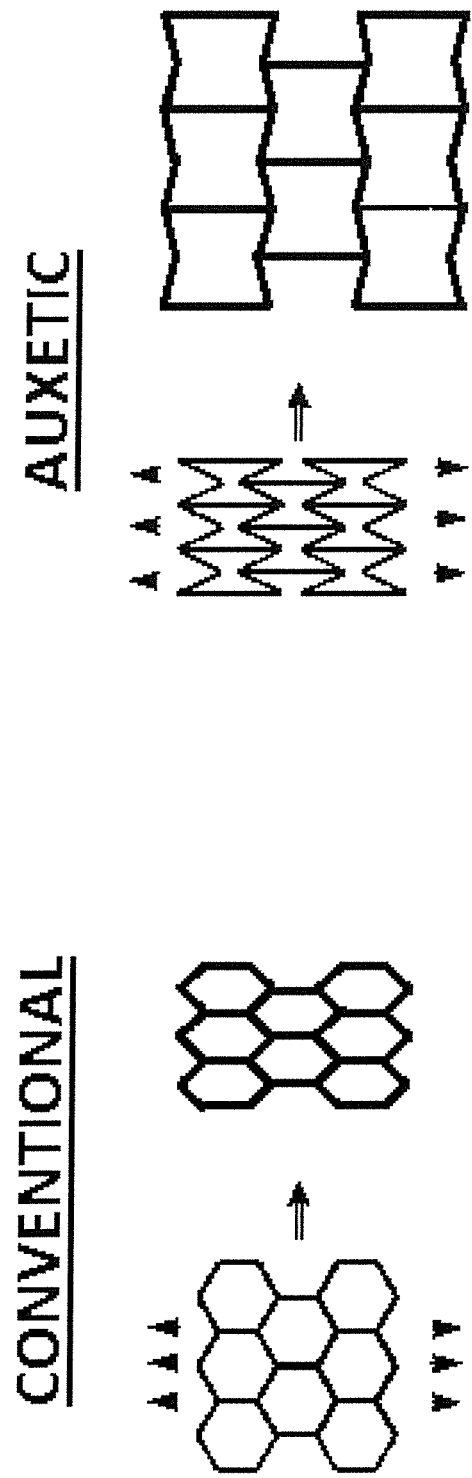
FIG. 1 shows a conventional and a modified auxetic honeycomb configuration.
Figure 3B:
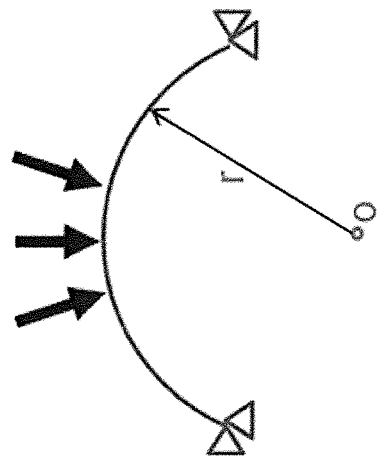
FIGS. 3a and 3b show the loading and the resulting compression on the hemispherical direction on a shell comprising auxetic cells.
Figure 3A:
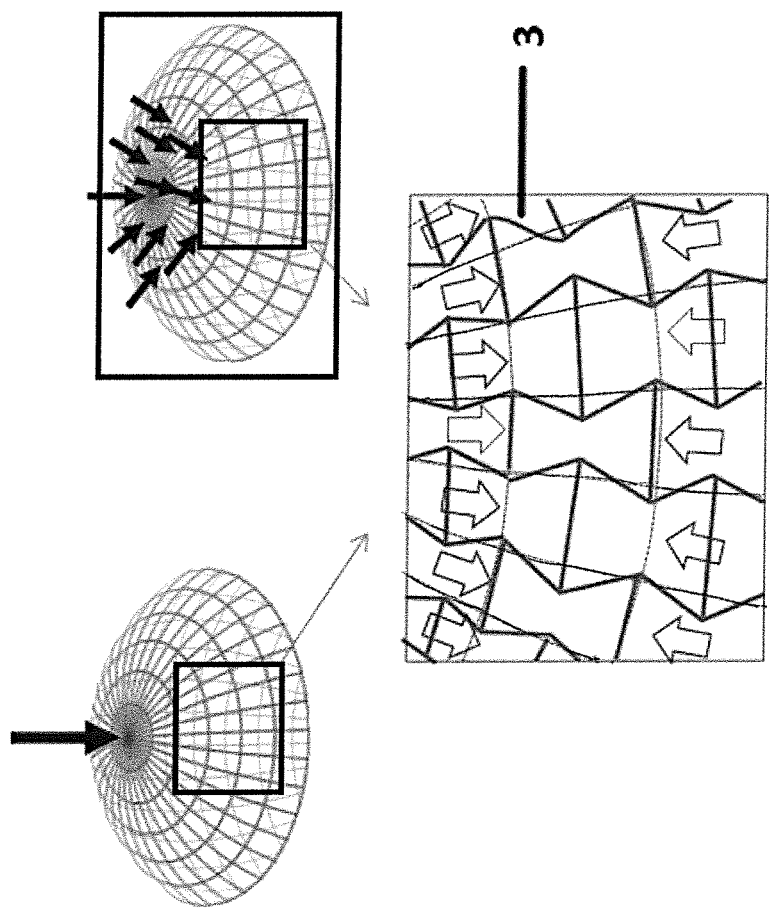
Figure 7:
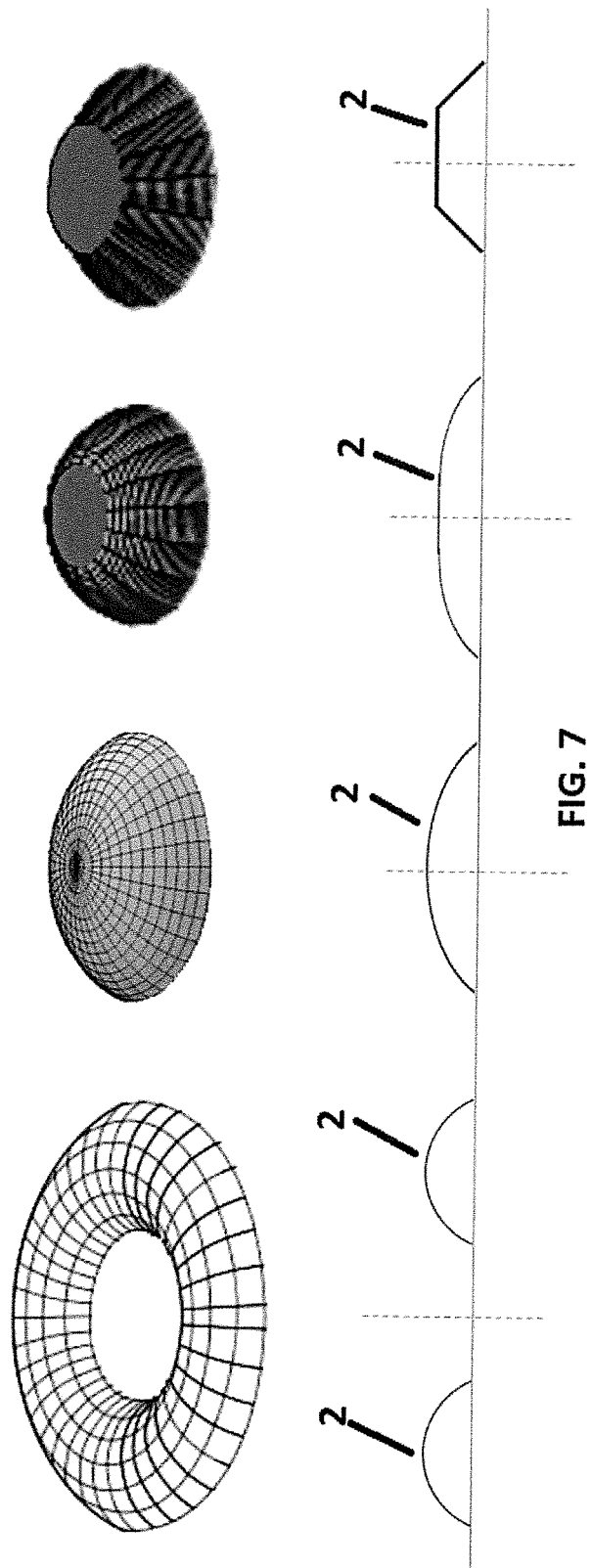
FIGS. 7 and 8 show a schematic representation of several embodiments of the shell object of the invention.
Figure 8:
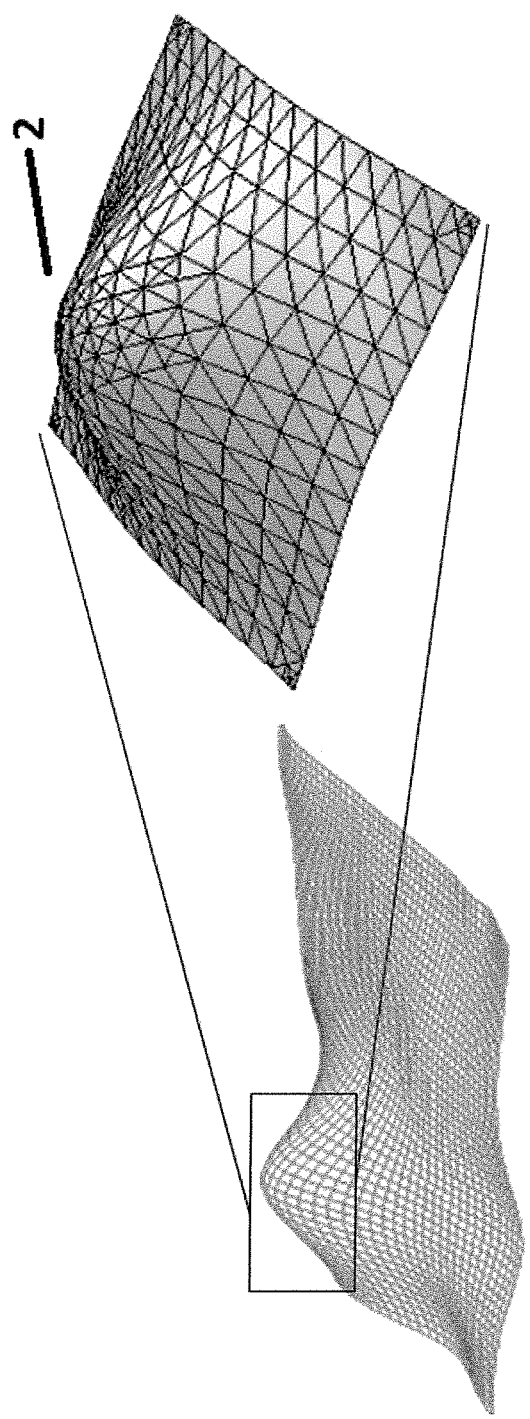
Figure 9:
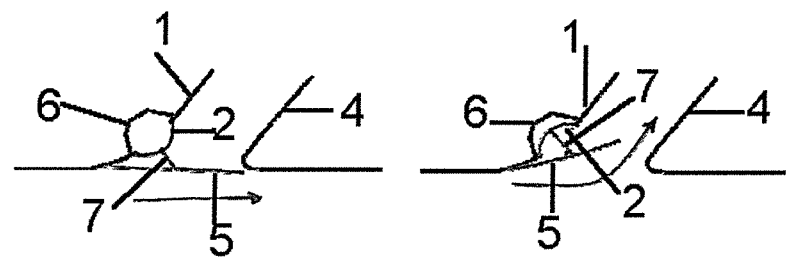
FIG. 9 show a schematic representation of a first embodiment of the invention located in the aperture of a duct.

FIG. 9 shows an embodiment in which the auxetic curved shell (2) is in the form of a spherical sector that is joined to a rigid element (1), specifically to the wall of an intake duct (4) having restricted two directions in a Cartesian coordinate system. Additionally, the auxetic bi-stable structure comprises a cover (5) coupled to the auxetic curved shell (2) such that the auxetic curved shell (2) is configured to be moved by the cover (5) between at least two stable positions. Thus, the cover (5) is moved without any foreign control to change between an open position on ground to a close position in cruise conditions or, what is the same, between a position of a full aperture and a position of a reduced aperture, thus reducing significantly the drag without adding additional active actuation system more complex that can fail and need to be maintained periodically.

Difference external pressure is acting on the cover (5) pushing or pulling the auxetic curved shell (2) to a new position. More specifically, the auxetic curved shell (2) covers a cavity (6) of the wall duct (4) and is movable between a concave and convex shape.

Additionally, the auxetic bi-stable structure comprises an arm (7) that connects the curved shell (2) to the cover (5). The arm (7) extends between the auxetic curved shell (2) and the cover (5) normally to the surface of the auxetic curved shell (2).

Figure 10:
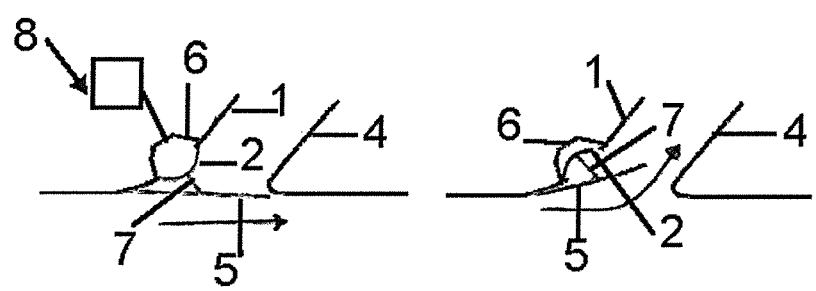
FIG. 10 show a schematic representation of a second embodiment of the invention also located in the aperture of a duct.

FIG. 10 discloses another embodiment that comprises a gas container (8) in communication with the auxetic curved shell (2), specifically through the cavity (6), being the gas container (8) and the auxetic curved shell (2) configured such that the gas container (8) is in communication with the auxetic curved shell (2) such that the gas of the gas container (8) moves the auxetic curved shell (2) between its two stable positions. The gas located in the container (8) has the particularity of having different pressure evolution with temperature than the air located in the interior of the duct, so that for the temperature range on the ground, it has a lower pressure and for the temperature at cruise altitude, it has a higher pressure. Therefore, when a side of the auxetic curved shell (2) has more pressure than the interior of the duct (4) at cruise altitude, the cover (5) is closed and when the side of the auxetic curved shell (2) has less pressure than the duct (4) at ground, the cover (5) is open.

In an alternative embodiment, the gas container (8) can be directly formed by the cavity (6) and the curved shell (2), that are joined so that they form a sealed container (8), such that the gas of this container (8) can move the auxetic curved shell (2) between its two stable positions, due to its different pressure between the temperature at ground altitude and at cruise altitude, without the need of a separate container (8).

Figure 11:
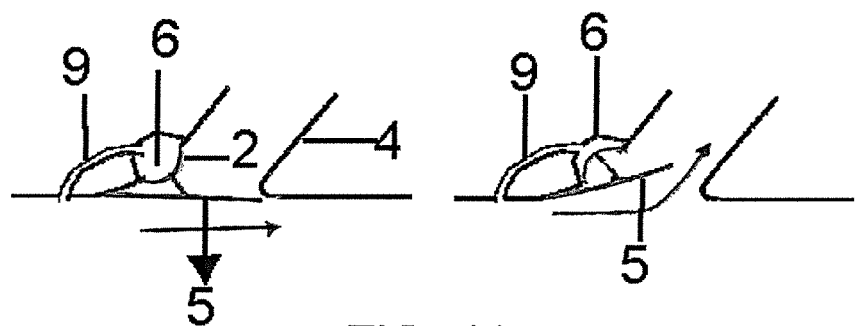
FIG. 11 show a schematic representation of a third embodiment of the invention located in the aperture of a duct.

FIG. 11 shows another embodiment that comprises a tubular connection or hole (9) that is configured to connect one of the faces of the auxetic curved shell (2) with an area having a pressure different than the pressure at the face, being the tubular connection (9) and the auxetic curved shell (2) configured such that the auxetic curved shell (2) is movable according to the pressure of the area. The tubular connection (9) is in communication specifically with the mentioned cavity (6) and the exterior of the duct (2), being the auxetic curved shell (2) configured such that when the a face of the auxetic curved shell (2) has more pressure than the duct (2), the cover (5) is closed and when the cavity (6) has less pressure than the duct (2), the cover (5) is open.

Figure 12A:
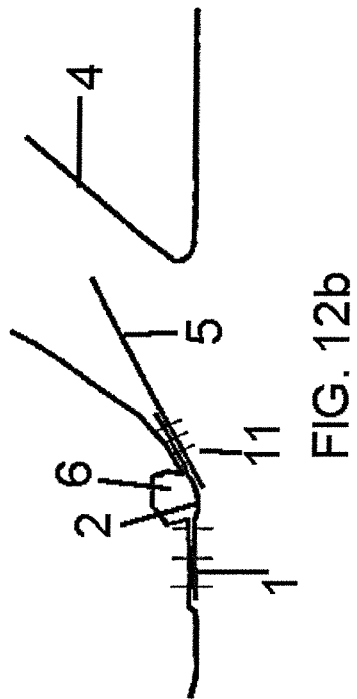
FIGS. 12a and 12b show a schematic representation of a fourth embodiment of the invention located in the aperture of a duct.
Figure 12B:
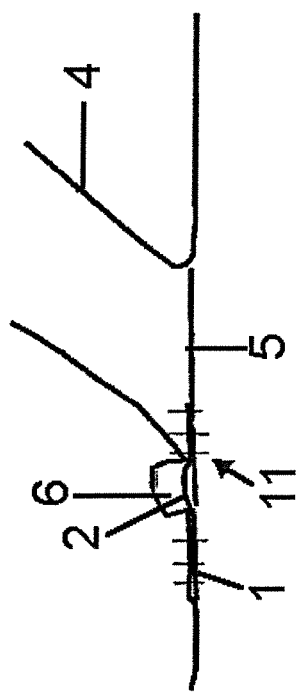

FIGS. 12a and 12 b disclose a variant of the previous embodiments showing the cover (5), the auxetic curved shell (2) joined to wall (1) of the duct (4) and the cavity (6). The cover (5) and the auxetic curved shell (2) are joined with rivets or an alternative joint such that the change from concave to convex shape of the shell (2) is directly transmitted to the cover (5) allowing the opening and closing positions of the cover (5). Hence, the pressure on the cover (5) produces a bending moment on the boundary of the curved shell (2) making it change from concave to convex without the need of an arm (7). FIG. 12a discloses the curved shell (2) located in a concave position and FIG. 12b discloses the curved shell (2) located in a convex position.

Figure 13:
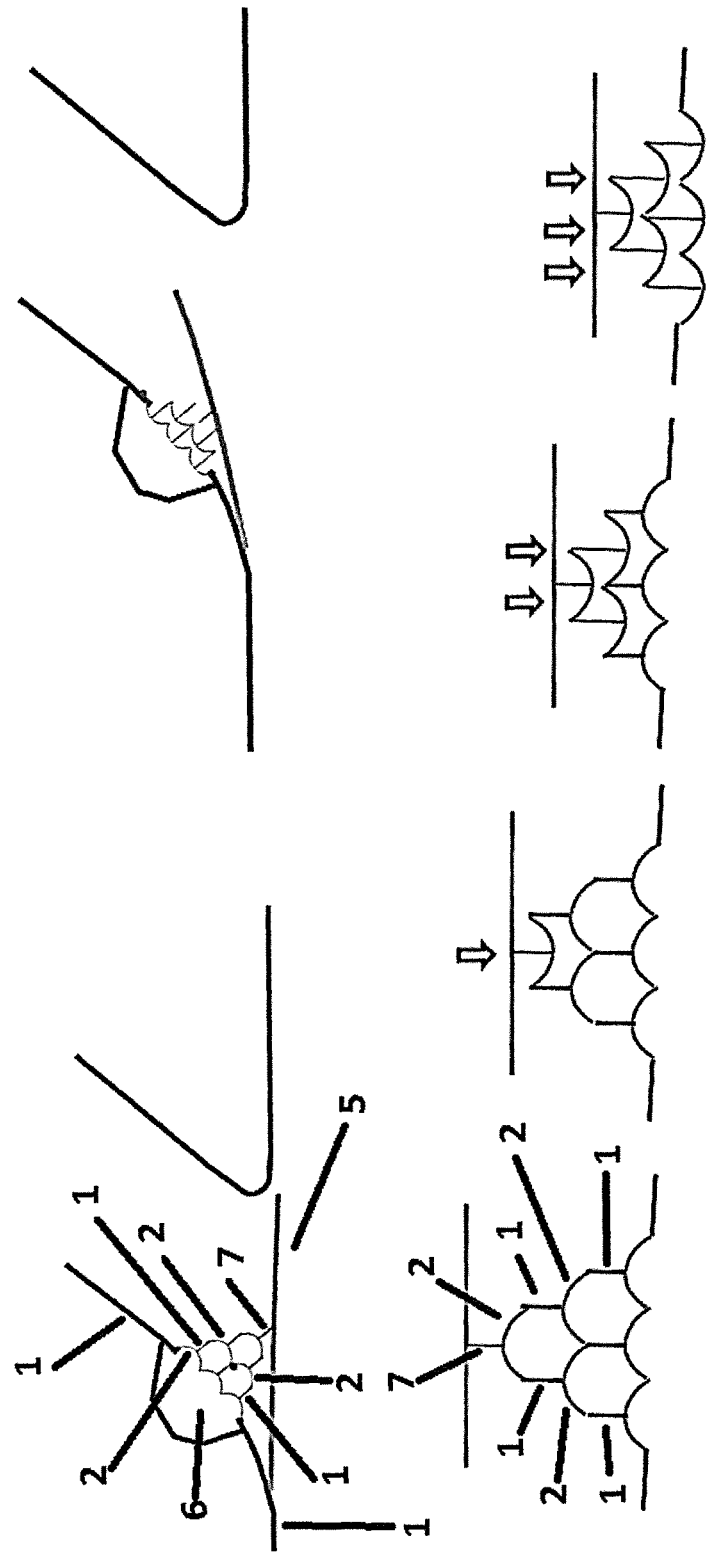
FIG. 13 show a schematic representation of a fifth embodiment of the invention located in the aperture of a duct.

FIG. 13 discloses another embodiment wherein the auxetic curved shell (2) is a sector of a spherical surface joined to a cylindrical rigid element (1). More specifically, the auxetic bi-stable structure comprises a set of bi-stable structures located in a stepped configuration where each rigid element (1) is supported by an auxetic curved shell (2) of the bi-stable structure located in a lower step, and additionally the cover (5) is coupled to the set of auxetic curved shells (2). The advantage of this configuration is that a stepped aperture of the cover (5) is performed.

FIG. 14 shows an additional embodiment in which the auxetic curved shell (2) is a sector of a cylindrical surface having a longitudinal axis, the rigid element (1) being a planar surface in the shown embodiment, the rigid element (1) and the auxetic curved shell (2) being joined along an axis of the auxetic curved shell (2) parallel to its longitudinal axis. The structure comprises a second rigid element (11) joined to the auxetic curved shell (2) along an axis of its surface parallel to its longitudinal axis such that the auxetic curved shell (2) is movable with respect to the first rigid element (1) and the second rigid element (11) is configured to follow the movement of the auxetic curved shell (2). In the implementation of this embodiment in FIG. 14, the second rigid element (11) acts as a cover (5) of the duct (4), therefore external pressure acting on the cover (5) bends the auxetic curved shell (2). It is also possible to join a set of auxetic curved shells (2), plus second rigid elements (3) following the shown configuration, such that a progressive aperture of the cover (5) is achieved. Although the embodiment shows both rigid elements (1) as a planar surface, other shapes are possible, like approximately flat or with a curvature less pronounced than the curvature of the auxetic curved shell (2).

FIG. 15 shows another embodiment that allows progressive movement on several fixed steps depending on the pressure steps increase and wherein the auxetic curved shell (2) may work, for instance, as a hinge that is self-blocking until certain pressure or load step increase is applied.

More specifically, the auxetic curved shell (2) is a sector of a cylindrical surface having a longitudinal axis shown in the side view depicted in FIG. 15a, the rigid element (1) being a planar surface in the shown embodiment, the rigid element (1) and the auxetic curved shell (2) being joined at a cross section of the auxetic curved shell (2) through a transition longitudinal area (10), the structure comprising a second rigid element (11) being a planar surface in the shown embodiment and joined to the auxetic curved shell (2) at a second cross section of the auxetic curved shell (2) through a transition longitudinal area (10), such that the auxetic curved shell (2) is movable with respect to the first rigid element (1) and the second rigid element (11) is configured to follow the movement of the auxetic curved shell (2). The auxetic curved shell (2) has high inertia due to the curvature of the section as shown in the section cut of FIG. 15c, which has higher resistance to bending, defining a stable or locking position. When a pressure or load is applied perpendicular to the second rigid element (11) it produces a bending moment on the boundary of the cylindrical shell (2) such that when it reaches certain threshold level it makes the surface change to a convex cylindrical surface around the traverse axis shown in the side view of FIG. 15b, with a straight traversal section as shown in the section cut of FIG. 15d, which has lower inertia and higher flexibility, allowing the movement of the second rigid element (11). As explained for the previous embodiment, although the present embodiment shows both rigid elements (1) as a planar surface, other shapes are possible, i.e., approximately flat or with a curvature less pronounced than the curvature of the auxetic curved shell (2).

Figure 17A:
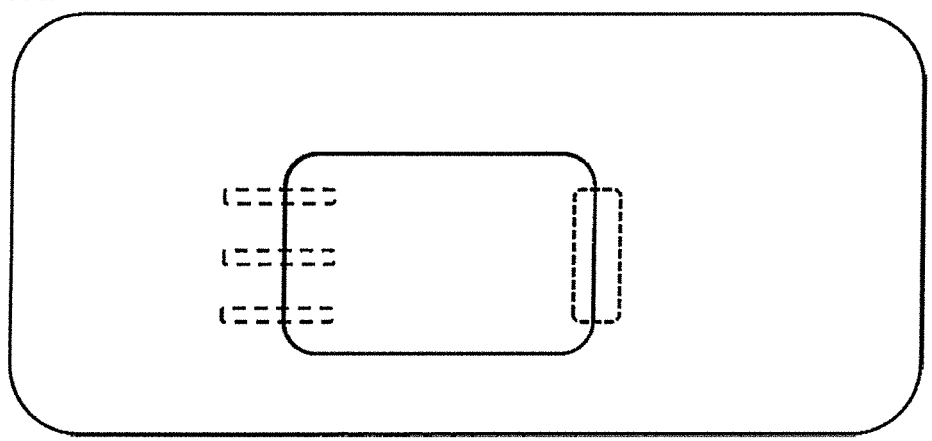
FIGS. 17a and 17b show a locking door in the positions open and close according to the embodiment shown in FIGS. 16a-16d.
Figure 17B:
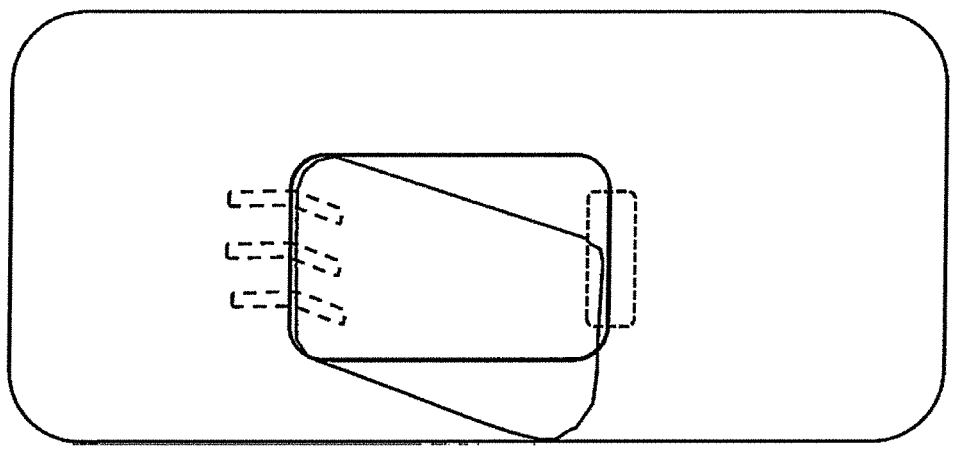

FIGS. 16a-16d show an application of the embodiment shown in FIG. 15 acting as a hinge in a door mechanism. FIGS. 16a and 16b show, respectively, the closed and open positions and FIGS. 16c and 16d show a section cut of the auxetic curved shells (2) at the closed and open position respectively. When the opening force or pressure on the door reaches a certain level, the bending moment produces the change of the cylindrical surface from concave to convex, allowing the opening of the door. FIGS. 17a and 17b represent a view of the door including several hinge mechanisms shown in FIG. 15, in a closed and open position respectively.

FIG. 18 shows an additional embodiment having a basis in the embodiment shown in FIG. 15. The hinge shown in FIG. 15 is applied to the intake of a duct (4) in which two mechanisms of the above embodiment are applied so that a door can be moved between at least two stable positions.

The combination of the two hinges as shown in FIG. 15, one inner (12) and other outer (13), so that the second rigid element (11) of each hinge mechanism are joined together at the extreme position so that they cannot separate apart, but they can slide over the surface between them. On FIG. 18a is shown the intake in the stable close position, in which the outer hinge mechanism (13) has a stable concave shape while the inner hinge mechanism (12) has a non-stable convex shape. Only when a certain increase of external pressure toward the inner direction is reached on the external rigid element of the outer hinge mechanism, its cylindrical surface changes from a concave to convex shape and the intake starts opening until the hinge element of the inner hinge mechanism changes its shape from convex to concave shape, blocking the open position of the intake that is shown on FIG. 18b. Again, only when a certain increase of external pressure is reached on the external rigid element of the outer hinge mechanism, towards the external direction, its internal cylindrical surface changes from a concave to convex shape starting the closing of the intake until the second hinge element changes its shape from convex to concave shape, blocking again the intake close position as shown on FIG. 18a.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An auxetic bi-stable structure, comprising:
an auxetic curved shell having a first stable position and a second stable position, and being movable between said first stable position and said second stable position, and
a rigid element,
wherein at least part of the surface of the auxetic curved shell is joined to the rigid element such that the curved shell is movable with respect to said rigid element between said first and second stable positions,
a cover coupled to the auxetic curved shell such that the cover or the auxetic curved shell is configured to be moved by an other of the cover or the auxetic curved shell between at least two stable positions,
wherein the auxetic curved shell is connected to the cover through an arm.

2. The auxetic bi-stable structure, according to claim 1, wherein the auxetic curved shell is a dome or a spherical or a cylindrical sector.

3. An auxetic bi-stable structure, comprising:
an auxetic curved shell having a first stable position and a second stable position, and being movable between said first stable position and said second stable position, and
a rigid element,
wherein at least part of the surface of the auxetic curved shell is joined to the rigid element such that the curved shell is movable with respect to said rigid element between said first and second stable positions,
a cover coupled to the auxetic curved shell such that the cover or the auxetic curved shell is configured to be moved by an other of the cover or the auxetic curved shell between at least two stable positions,
further comprising a gas container in communication with the auxetic curved shell, being the gas container and the auxetic curved shell configured such that the gas container is in communication with the auxetic curved shell, such that the gas of the gas container is configured to move the auxetic curved shell between its two stable positions.

4. An auxetic bi-stable structure, comprising:
an auxetic curved shell having a first stable position and a second stable position, and being movable between said first stable position and said second stable position, and
a rigid element,
wherein at least part of the surface of the auxetic curved shell is joined to the rigid element such that the curved shell is movable with respect to said rigid element between said first and second stable positions,
a cover coupled to the auxetic curved shell such that the cover or the auxetic curved shell is configured to be moved by an other of the cover or the auxetic curved shell between at least two stable positions,
further comprising a tubular connection that is configured to connect one of the faces of the auxetic curved shell with an area having a pressure different than the pressure at said face, being the tubular connection and the auxetic curved shell configured such that the auxetic curved shell is movable according to the pressure of said area.

5. An auxetic bi-stable structure, comprising:
an auxetic curved shell having a first stable position and a second stable position, and being movable between said first stable position and said second stable position, and
a rigid element,
wherein at least part of the surface of the auxetic curved shell is joined to the rigid element such that the curved shell is movable with respect to said rigid element between said first and second stable positions, wherein the auxetic curved shell is a sector of a spherical surface joined to a cylindrical rigid element.

6. The auxetic bi-stable structure, according to claim 5, further comprising a set of bi-stable structures, each bi-stable structure comprising the auxetic curved shell being a sector of a spherical surface joined to the cylindrical rigid element, the set being located in a stepped configuration where each rigid element is supported by an auxetic curved shell of the bi-stable structure located in a lower step.

7. The auxetic bi-stable structure, according to claim 6, wherein a cover is coupled to the set of auxetic curved shells.

8. The auxetic bi-stable structure, according to claim 5, wherein the auxetic curved shell comprises a plurality of interconnected auxetic cells having an auxetic behavior in a surface direction of the shell.

9. The auxetic bi-stable structure, according to claim 5, wherein the auxetic curved shell and the rigid element are joined such that the rigid element is configured to restrict the movement of the part of the surface of the auxetic curved shell joined to the part of the surface in one direction in a Cartesian coordinate system.

10. The auxetic bi-stable structure, according to claim 5, wherein the auxetic curved shell and the rigid element are joined such that the rigid element is configured to restrict the movement of the part of the surface of the auxetic curved shell joined to the part of the surface in two directions in a Cartesian coordinate system.

11. The auxetic bi-stable structure, according to claim 5, wherein the auxetic curved shell and the rigid element are joined such that the rigid element is configured to restrict the movement of the part of the surface of the auxetic curved shell joined to the part of the surface in two directions and in a momentum perpendicular to said two directions in a Cartesian coordinate system.

12. The auxetic bi-stable structure, according to claim 5, wherein the auxetic curved shell is a sector of a cylindrical surface having a longitudinal axis, the rigid element and the auxetic curved shell being joined along an axis of the auxetic curved shell parallel to its longitudinal axis, the structure comprising a second rigid element joined to the auxetic curved shell along an axis of its surface parallel to its longitudinal axis, such that the auxetic curved shell is movable with respect to the first rigid element, the second rigid element being configured to follow the movement of the auxetic curved layer.

13. The auxetic bi-stable structure, according to claim 5, wherein the auxetic curved shell is a sector of a cylindrical surface having a longitudinal axis, the rigid element and the auxetic curved shell being joined at a cross section of the auxetic curved shell through a transition longitudinal area, the structure comprising a second rigid element joined to the auxetic curved shell at a second cross section of the auxetic curved shell through a transition longitudinal area, such that the auxetic curved shell is movable with respect to the first rigid element, the second rigid element being configured to follow the movement of the auxetic curved shell.

14. The auxetic bi-stable structure, according to claim 5, further comprising a cover coupled to the auxetic curved shell such that the cover or the auxetic curved shell is configured to be moved by an other of the cover or the auxetic curved shell between at least two stable positions.

\* \* \* \* \*